May 22, 1962 E. G. LILL 3,035,675
OVERLOAD CLUTCH FOR POWER LAWN MOWER
Filed Nov. 10, 1958 3 Sheets-Sheet 1
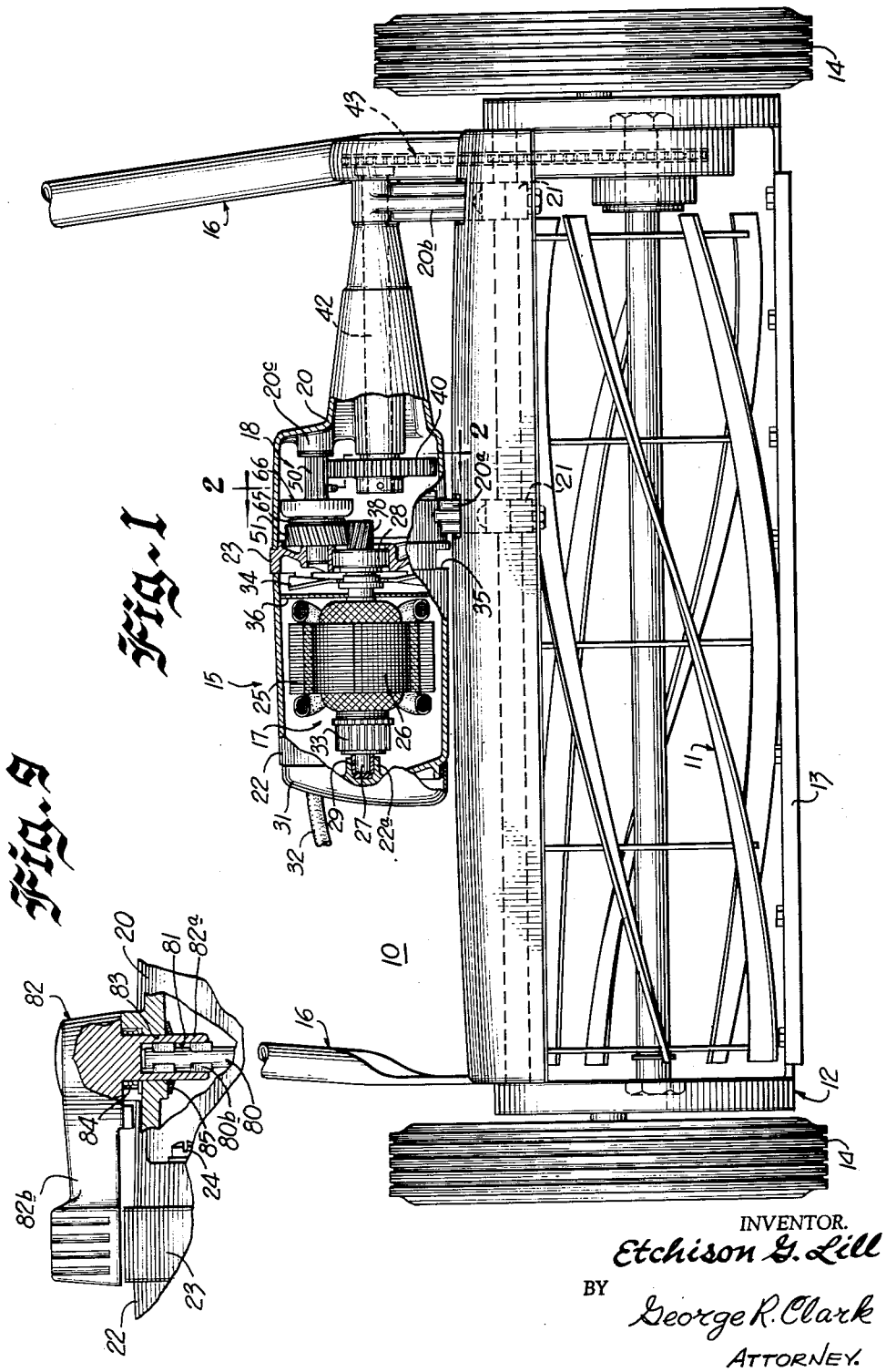
INVENTOR.
Etchison G. Lill
BY
George R. Clark
ATTORNEY.

May 22, 1962　　　　E. G. LILL　　　　3,035,675
OVERLOAD CLUTCH FOR POWER LAWN MOWER
Filed Nov. 10, 1958　　　　　　　　　　3 Sheets-Sheet 2
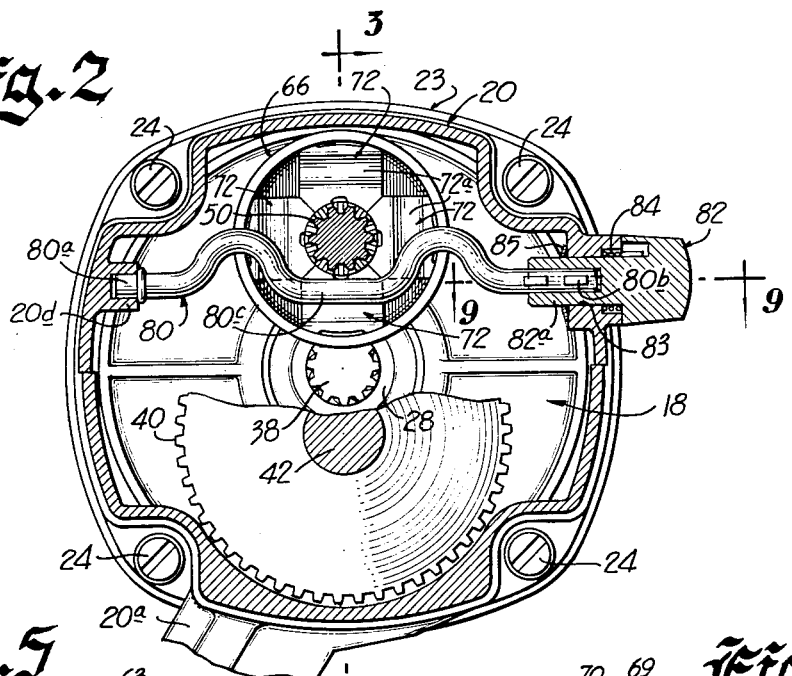
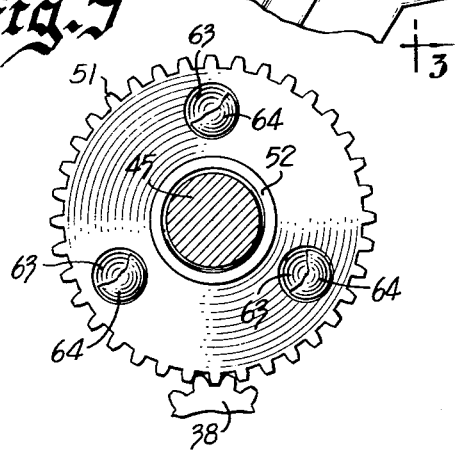
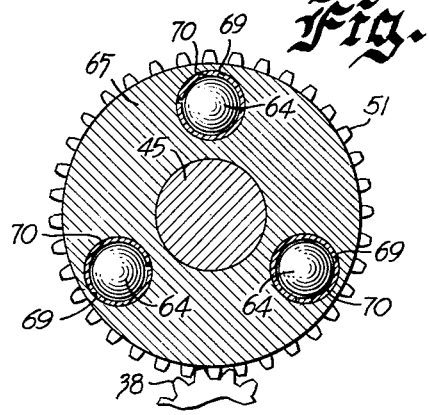
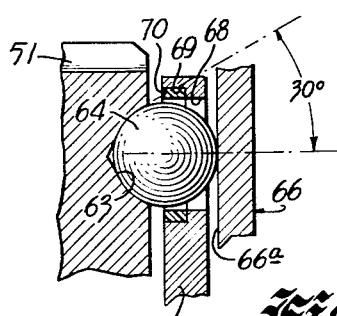
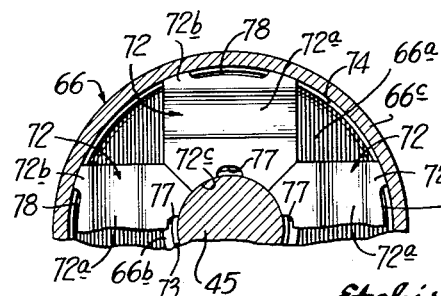
INVENTOR.
Etchison G. Lill
BY George R. Clark
ATTORNEY May 22, 1962 E. G. LILL 3,035,675
OVERLOAD CLUTCH FOR POWER LAWN MOWER
Filed Nov. 10, 1958 3 Sheets-Sheet 3

INVENTOR.
Etchison G. Lill
BY
George R. Clark
ATTORNEY

United States Patent Office 3,035,675
Patented May 22, 1962

3,035,675
OVERLOAD CLUTCH FOR POWER LAWN MOWER
Etchison G. Lill, Wheaton, Ill., assignor to Sunbeam Corporation, Chicago, Ill., a corporation of Illinois
Filed Nov. 10, 1958, Ser. No. 772,881
11 Claims. (Cl. 192—56)

The present invention relates to an overload clutch, and more particularly to an overload clutch for a power operated lawn mower.

The power operated lawn mower has become increasingly popular during the last several years. Such power operated lawn mowers are of two principal types, the so-called rotary type mower and the reel type mower. These mowers are powered by various types of prime movers, such as internal combustion engines, electric motors and the like. It will be appreciated that it is not at all unusual for the cutting blades or reels of such mowers to strike foreign objects such as sticks or stones which are occasionally found on the lawn being mowed. In the reel type mower particularly, sticks or other objects sometimes become wedged between the moving reel and cutter bar which are disposed in shearing relationship with each other. Such wedging action of course stops the reel, and when the reel is power driven, as in the case in a power operated reel type mower, there is always the problem of damage to the mower parts. In the first place, it is undesirable to have such stoppage of the reel cause stalling of the prime mover. Consequently, it has been the practice to provide some sort of clutch arrangement so that when the reel stops by virtue of a stick or other foreign object causing jamming thereof the prime mover may continue to operate. The most common arrangement heretofore has comprised a belt drive which, when the reel is jammed, slips to prevent damage to the mower. Such an arrangement has proved to be quite dangerous in that sometimes the operator fails to shut off the motor or engine when such jamming has occurred and removes the object from the reel under these conditions. This means that as soon as the foreign object is removed the reel begins to rotate and loss of a finger or other injury to the user unfortunately has been all too common. It would be desirable, therefore, to provide an overload clutch mechanism for such reel type mowers which, in the case of jamming of the reel, completely disconnects the driving connection between the prime mover and the reel, which driving connection is not reestablished until a deliberate resetting operation is performed by the user. Preferably also, this resetting operation cannot be performed except from a position where the user is away from the reel.

Overload clutches of the type where a torque transmitting action cannot be reestablished except by a positive act have been suggested involving some sort of overcenter mechanism. Unfortunately, in most of these overcenter type devices springs have been used which are constantly stressed during use with the result that spring failure is very common. Attempts have been made to provide arrangements where spring failure has been reduced, but in these arrangements overstressing has commonly occurred in moving from one overcenter position to the other. Moreover, such specialized arrangements have been difficult to fabricate and install, and complete disassembly of the clutch mechanism has always been required for maintenance purposes, when repair or replacement is desired. In any event, it is important in overload clutches for lawn mowers of the type discussed above that full torque is delivered through the clutch mechanism at all times until an overload occurs. Moreover, upon the occurrence of such overload the clutch must release instantly and remain released until positively restored by some act of the operator.

Heretofore it has been difficult to mass produce overload clutches which will release at a predetermined overload. If the release does not occur until the torque is very high damage to the mower may result, while if the release occurs at a low torque the clutch may interrupt the transmission of power under high load conditions where there is no desire to disconnect the driving power. It would be desirable to provide an overload clutch which may be manufactured on a mass production basis in which each unit will operate to release at a uniform torque. It would furthermore be desirable to provide an overload clutch having a minimum number of parts and occupying a minimum amount of space. It would also be desirable to provide such a clutch which can be incorporated with the reduction gear mechanism or the like commonly employed with prime movers connected to drive reel type mowers. In addition, it would be desirable to provide such an overload clutch which, once an overload occurs, cannot be accidentally reengaged except by a positive act of the user.

Accordingly, it is an object of the present invention to provide a new and improved overload clutch for a power operated lawn mower.

It is a further object of the present invention to provide an approved overload clutch having the desirable features referred to above.

It is another object of the present invention to provide an improved overload clutch for a power lawn mower which is sturdy and compact, which is inexpensive to manufacture and which will give long years of foolproof operation.

It is another object of the present invention to provide an overload clutch for a power operated lawn mower which when actuated to the disengaged position by an overload cannot be restored to operation except by a deliberate act of the user.

Still another object of the present invention resides in an improved overload clutch for a power operated lawn mower which utilizes a minimum number of parts and in which the reduction gear mechanism commonly associated with such a lawn mower provides some of the parts of the overload clutch.

Other objects and advantages of the present invention will become apparent as the following description proceeds and the features of novelty which characterize the invention will be pointed out with particularity in the claims annexed to and forming a part of this specification.

For a better understanding of the present invention reference may be had to the accompanying drawings in which:

FIG. 1 is a fragmentary front view of a power driven lawn mower including the overload clutch mechanism of the present invention with portions thereof cut away more clearly to illustrate the present invention;

FIG. 2 is an enlarged sectional view taken on line 2—2 of FIG. 1 assuming that FIG. 1 shows the complete structure with the clutch in the engaged or torque transmitting condition;

FIG. 5 is a sectional view taken on line 5—5 of FIG. 3, assuming that FIG. 3 shows the complete structure and with certain portions cut away;

FIG. 6 is a sectional view taken on line 6—6 of FIG.

Figure 3:
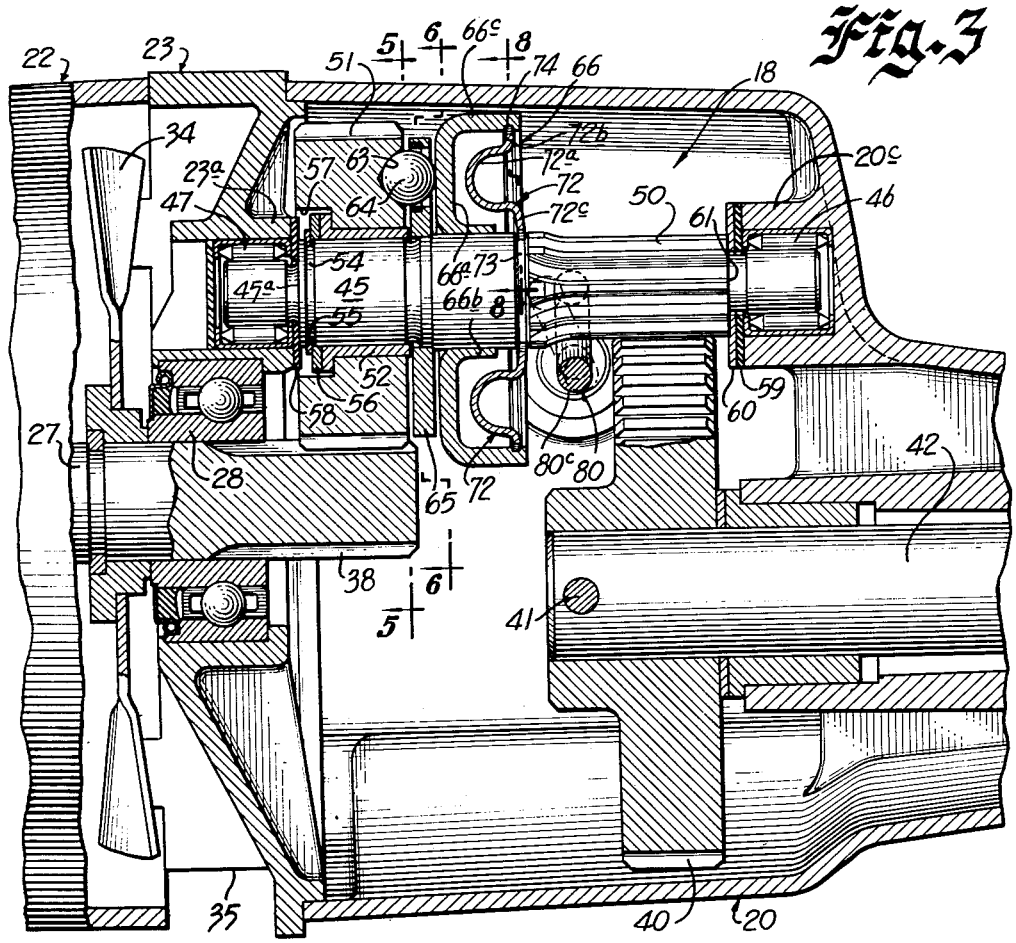
FIG. 3 is an enlarged fragmentary view of a portion of FIG. 1 as well as a sectional view taken on line 3—3 of FIG. 2 assuming that FIG. 2 shows the complete structure.

3, again assuming that FIG. 3 shows the complete structure;

FIG. 7 is a greatly enlarged fragmentary view of a portion of FIG. 3;

FIG. 8 is an enlarged fragmentary sectional view taken along line 8—8 of FIG. 3; and FIG. 9 is a fragmentary top view of a portion of FIG. 3 with certain portions cut away.

Briefly, the present invention is concerned with a sturdy, compact, inexpensive overload clutch for a reel type lawn mower. This clutch involves an overcenter mechanism which holds the clutch members in driving or torque transmitting engagement until an overload occurs by jamming of the mower reel and then the clutch members quickly cam themselves out of driving engagement with one another, whereupon the overcenter mechanism holds the clutch members out of driving engagement until a resetting operation occurs by a positive or deliberate action of the user. The overcenter mechanism is actuated by leaf springs having bowed central portions which provide a maximum force with a minimum strain on the members. The overload clutch mechanism utilizes portions of the gear train of the reduction gear mechanism commonly employed with power operated reel type mowers.

It will be understood that the power operated clutch of the present invention may have numerous applications other than in a power operated lawn mower. Furthermore, it may be used with various types of lawn mowers, whether of the reel or rotary type and regardless of the type of prime mover employed. For the purpose of illustrating and describing the present invention, it has been shown in association with an electrically powered reel type lawn mower. It should be understood that the particular type of lawn mower and the particular type of prime mover illustrated in the drawings form no part of the present invention and are solely for the purpose of showing an application of the overload clutch of the present invention.

Referring now to the drawings, there is illustrated in FIG. 1 a power operated lawn mower generally designated at 10. This lawn mower is specifically illustrated as being of the reel type comprising the conventional reel 11 suitably mounted for rotation in a frame 12 which frame supports the conventional cutter bar 13. The frame 12 is suitably supported on ground wheels 14. For the purpose of driving the reel 11 and if desired also the ground wheels 14, there is provided a suitable prime mover generally designated by the reference numeral 15 which is drivingly connected to the reel 11 and if desired the ground wheels 14. For the purpose of guiding the mower during a lawn cutting operation, a suitable handle of conventional construction is provided which is connected to the mower as by the conventional fork member indicated at 16 in the drawings.

Although the overload clutch mechanism of the present invention may be associated with any type of prime mover such as an internal combustion engine or electric motor, the prime mover 15, by way of example, has been illustrated specifically as comprising an electric motor 17 and an associated reduction gear mechanism including the overload clutch of the present invention described in greater detail hereinafter. The overload clutch and reduction gear mechanism are generally designated by the reference number 18.

The electric motor 17 may be very similar to the motor employed with the lawn mower of copending Jepson application Serial No. 574,489, filed March 28, 1956, now Patent No. 2,926,478, and assigned to the assignee of the instant application. As illustrated in FIG. 1 of the drawings there is provided a housing 20 for the overload clutch and reduction gear mechanism 18 of the present invention. This housing is preferably formed as a generally cylindrical casting including an elongated tapered portion and also including integrally formed arms or bracket extensions 20a or 20b which are suitably clamped to the frame 12 of lawn mower 10 as by clamps 21. The gear housing 20 thus forms a support to which the motor 17 may be mounted. To this end there is provided a motor housing 22 of cup-shaped configuration. The open end of the motor housing 22 is suitably secured to the gear housing 20 with a gear housing closure plate and bearing support member 23 clamped between the open ends of these housings 20 and 22 by suitable studs 24 (FIG. 2). The motor 17 comprises a field structure 25, suitably supported in motor housing 22, and an armature 26 mounted on a shaft 27 which has one end journaled in a bearing 28 supported in plate 23 and the other end journaled in a bearing 29 supported in a bearing support 22a formed integrally with the closed end of motor housing 22. Actually this so called closed end of the motor housing has a plurality of openings therein (not shown) for cooling air which are protected from the weather by a motor cover 31 through which an electric power cord 32 extends to supply power to the motor windings in a manner well understood by those skilled in the art. The motor 17 is illustrated as being of the so called universal type including a commutator 33 and associated brushes, not shown. Mounted on the motor shaft 27 is a cooling fan 34 which draws air through the openings in the so called closed end of motor housing 22 over the motor windings and out through an air outlet opening 35 defined in the plate 23. Preferably a baffle 36 insures that the cooling air flow is directed over the windings.

For the purpose of supplying a rotary torque to the combined reduction gear and overcenter clutch mechanism 18 from the motor 17 the end of the motor shaft 27 is provided with a suitable output gear 38 which may be hobbed directly onto the shaft 27. The output torque of the reduction gear and overcenter clutch mechanism 18 is transmitted to an output gear 40 which is fixed by a key or pin 41 to a driven or output shaft 42 suitably journaled within the gear housing 20. This driven shaft 42 is drivingly connected by any suitable means with the reel 11. This drive might comprise a chain and sprocket arrangement generally designated at 43. In such case a suitable sprocket will be secured to the end of shaft 42 remote from gear 40. Preferably the means for drivingly interconnecting reel 11 and shaft 42 is a positive drive such as gears, a chain and sprocket drive or the like. The construction described this far, aside from the combined overload clutch and reduction gear mechanism 18 of the present invention described in detail hereinafter, forms no part of the present invention and is fully described and claimed in the copending concurrently filed Jepson application referred to above.

For the purpose of transmitting a rotary torque from the motor shaft 27 to the output or driven shaft 42 the combined reduction gear mechanism and overcenter clutch 18 includes an auxiliary or secondary shaft 45 which is suitably journaled in aligned bearing houses 20c and 23a which are integrally formed with the gear housing 20 and the plate 23 respectively. These aligned bearing houses 20c and 23a suitably support bearings 46 and 47, respectively, which are specifically illustrated as needle bearings. The bearing 47 is preferably of the type having a closed end so lubrication cannot escape into the motor housing 22. Also, as illustrated in the drawings, the auxiliary shaft 45 is provided with a gear 50 which may be hobbed directly onto the shaft 45 in a position drivingly to engage the output gear 40. This gear 50 is thus adjacent the bearing housing 20c. It will be apparent that by virtue of the relative diameters of gears 40 and 50 rotation of the auxiliary or secondary shaft 45 will cause simultaneous rotation at a reduced speed of the output shaft 42.

For the purpose of causing shaft 45 to rotate in response to rotation of motor shaft 27, there is provided a gear 51 rotatably mounted on the auxiliary shaft 45 as by a flanged bearing 52, which latter may be formed of powdered bronze or the like. The gear 51 is drivingly engaged with the gear 38 on the output shaft 27. In view of the overcenter clutch mechanism of the present invention, the auxiliary shaft 45 as well as the gear 51 will be subjected to end thrusts, as will become apparent from the ensuing description. In order to prevent movement to the left of gear 51 as viewed in FIG. 3 of the drawings, the shaft 45 is provided with a circumferential groove 54 for receiving a retaining ring 55 which holds a steel thrust washer 56 in position against the flanged bushing 52. As illustrated in the drawings, the gear 51 is recessed as indicated at 57 to receive the elements 55 and 56. A fiber thrust washer 58 bearing against a shoulder 45a defined on shaft 45 limits movement to the left of shaft 45 as viewed in FIG. 3 of the drawings. This fiber thrust washer also tends to retain grease within the bearing 47 disposed in bearing housing 23a. So as to prevent movement to the right of this auxiliary shaft 45 as viewed in FIG. 3 of the drawings, there is provided on shaft 45 adjacent the open end of bearing housing 20c a fiber thrust washer 59 and a steel thrust washer 60. The fiber washer 59 bears against the end of bearing housing 20c and seals the needle bearing 46 so as to keep grease within this bearing. The steel thrust washer 60 engages a shoulder 61 defined on shaft 45 at the end of gear 50.

In accordance with the present invention the gear 51 in addition to forming part of the reduction gear chain also is one element of the overcenter clutch mechanism of the present invention. To this end the gear 51 is not only a conventional gear but provides an element of the overcenter clutch. As clearly illustrated in FIGS. 3, 5 and 7 of the drawings, the face thereof opposite the side having the recess 57 is provided with a plurality of angularly spaced conical recesses 63, the purpose of which will become apparent from the following description. In addition to the gear 51, the overcenter clutch mechanism includes a plurality of steel balls or spherical members 64, one for each of the conical recesses 63, and a combined ball retainer and drive plate 65. The clutch mechanism further includes a cup-shaped clutch cup or presser plate 66. The combined ball retainer and drive plate 65 is suitably secured to the shaft 45 as by brazing or the like so that it rotates as a unit with the shaft 45. This plate 65 prevents movement of gear 51 along shaft 45 to the right as viewed in FIG. 3 of the drawings. It will be appreciated that, if the gear 51 which is rotatably mounted on the shaft 45 is effectively secured to this shaft, a driving torque will be transmitted from the gear 38 on motor shaft 27 to the output shaft 42. The cup-shaped presser plate 66, the combined ball retainer and drive plate 65 and the balls 64 provide means for effectively and selectively securing the gear 51 to the shaft 45 whenever such transmission of driving torque is desired. Moreover, this is accomplished in a manner which will interrupt such torque transmission when a predetermined overload due to a jammed reel occurs. The function of the pressure plate 66 is to force the balls 64 into the recesses 63 in the gear 51 with the result that the gear 51 effectively drives the drive plate 65 secured to the shaft 45.

Considering now the details of the combined ball retainer and drive plate 65 and the recesses 63 in the gear 51 as well as the balls 64, it will be understood that the balls 64 must be cammed out of the pockets or recesses 63 upon the occurrence of a predetermined overload. Thus this camming action should occur solely in response to a great increase in torque. To this end the walls defining the recesses 63 primarily engaged by the balls 64, as best shown in FIG. 7 of the drawings are disposed at an angle of 30 degrees relative to the central or longitudinal axis of the recesses 63. The bottoms of the recesses, however, are somewhat flattened so that there is clearance between the balls and the bottoms. This arrangement provides smooth ejection of the balls 64 from the sockets 63 when an overload occurs. It will be appreciated that the number of recesses 63 and balls 64 may vary, but it has been found that at least three such recesses and a corresponding number of balls should be used, preferably equiangularly spaced on the same circumference. In a device built in accordance with the present invention three recesses 63 were provided in the gear 51 spaced at 120-degree intervals. The depth of each recess was such relative to the diameter of the balls that slightly less than forty percent of the diameter of each ball entered the recess when the ball was firmly seated therein. In this device, the balls 64 had a diameter of one-quarter inch.

In accordance with the present invention, the drive plate and ball retainer 65 is provided with a plurality of openings 68 (FIG. 7). These openings are the same in number as the recesses 63 in gear 51 and are equally spaced on a common circumference. In accordance with the present invention each of these openings is counterbored on the face adjacent gear 51 as indicated at 69 to receive therein a plastic sleeve or bushing 70, preferably formed of a polyamide such as nylon. It has been found that this nylon sleeve introduces sufficient bearing resilience so that upon engagement and release of the overcenter clutch mechanism no fretting of the walls defining recesses 63 in gear 51 nor the walls defining openings 68 in the drive plate 65 occurs. Without these inserts, however, such fretting action takes place.

The clutch cup or presser plate 66 may comprise a metal stamping shaped in the form of an annular or circular channel. Essentially, it comprises an annular surface 66a for pressing against the balls 64 to retain them in their recesses 63. This annular surface 66a is provided with an integral lateral flange 66b of cylindrical configuration and of a diameter such as to define an inner sleeve slidably engaging the shaft 45. The clutch cup or presser plate 66 further includes an outer circular sleeve portion 66c which extends as a lateral flange from the annular surface 66a. It will be understood that the presser plate 66 is intended to have limited longitudinal movement along the axis of shaft 45 between the two extreme positions shown in FIGS. 3 and 4 of the drawings.

For the purpose of moving the annular surface 66a toward the left, as viewed in FIG. 3 of the drawings, to hold the balls 64 in the recesses 63 and, hence, effectively to unite the gear 51 with the shaft 45, there are provided a plurality of overcenter springs 72, four of them being illustrated in FIG. 2 of the drawings. These overcenter springs, as best shown in FIGS. 2 and 3 of the drawings, each comprise a U-shaped central section 72a with a pair of end projections 72b and 72c extending from the ends of the legs of the U-shaped portion 72a. As best shown in FIG. 8 of the drawings, the flange 72b has a convex end configuration so as to conform to the curvature of the flange or outer sleeve 66c of the clutch cup 66, while the portion 72c of the overcenter springs 72 terminates in a concave end configuration with a curvature conforming with that of the shaft 45.

As best illustrated in FIG. 3 of the drawings, the shaft 45 is provided with a recess 73 for receiving therein the flanges 72c of the overcenter springs 72. Similarly, the interior of the outer sleeve or flange 66c of the clutch cup 66 is provided with a groove 74 to receive the concave ends of the overcenter springs 72. It will be apparent, therefore, that the overcenter springs 72 are inserted in the grooves 73 and 74 so as to stress the U-shaped portion 72a to a maximum extent when the groove 74 is directly above the groove 73 as viewed in FIG. 3 of the drawings. This is the dead center position, and when in this position the springs 72 will tend to urge the clutch cup 66 to either the position shown in FIG. 3 or the position shown in FIG. 4 of the drawings.

Each of the springs 72 is, of course, formed of sheet metal spring stock. The flange 72c which terminates in the concave end preferably has a central notch or relieved portion 77, as best shown in FIG. 8 of the drawings. Similarly, the convex end of flange 72b is provided with a central notch 78. These notches 77 and 78 prevent any binding of the overcenter springs in moving the clutch cup 66 to either of its two extreme positions. As illustrated the grooves 73 and 74 are provided with side walls that flare outwardly at approximately an angle of thirty degrees thus further assuring no binding. It will be appreciated that by virtue of the U-shaped portion 72a the springs 72 may be made of relatively thick and sturdy spring material and yet do not require excessive force to stress the same in moving from one extreme position to the other. Furthermore, with this arrangement the springs are under a relatively low stress condition when in either of the positions shown in FIG. 3 or FIG. 4 of the drawings. The length of the legs of the U-shaped portion 72a is such as to give adequate leverage in compressing the springs.

It will be appreciated that the depth of the recesses 63 must be substantially greater than the movement of the clutch cup 66 from the position shown in FIG. 3 to the dead center position where the grooves 73 and 74 are in the same vertical plane as viewed in FIG. 3 of the drawings. This is so that when the balls 64 are cammed out of the recesses 63 the clutch cup 66 will always be moved past dead center, whereupon the springs 72 will force it to move to the other extreme or declutched position shown in FIG. 4 of the drawings. In a commercial embodiment built in accordance with the present invention, the clutch cup 66 moved about one-eighth of an inch between its two extreme positions with the balls being one-quarter of an inch in diameter. The springs 72 were of spring steel 0.035 of an inch in thickness and five-eighths of an inch wide at the widest place. In order that the springs 72 may be snapped into the grooves in a simple manner during an assembly operation, the groove 74 is preferably very close to that end of the outer sleeve 66c remote from the annular surface 66a.

It will be appreciated that any jamming of the reel will cause the shaft 45 to stop rotating. Since the combined ball retainer and drive plate 65 is secured to shaft 45, it also stops. Gear 51, on the other hand, continues to rotate, and it can only do this by camming the balls 64 out of the recesses 63, which results in longitudinal movement along the shaft of the clutch cup 66 to the position shown in FIG. 4 of the drawings. The driving connection, therefore, is interrupted, and until clutch cup 66 is positively moved from the position shown in FIG. 4 to the position shown in FIG. 3 of the drawings, no power can be transmitted from the motor 17 to the output shaft 42.

In order that the overload clutch may be reset manually after it has been thrown out, there is provided a resetting mechanism best shown in FIGS. 2 and 9 of the drawings. This mechanism includes a clutch reset rod 80 which has one end 80a thereof rotatably supported in a suitable bearing support 20d integrally formed in the gear housing 20. The other end comprises flattened portions 80b fitting into a keyed slot 81 in a shaftlike portion 82a of a clutch reset lever 82 which has a manually actuatable extension 82b. The clutch reset lever has the shaftlike portion 82a pivotally supported in an opening 83 defined in the gear housing 20. A suitable coiled torsion spring 84, disposed in a recess in the housing 20 concentric with the opening 83, biases the clutch reset lever 82 to a nonresetting position. Also a retaining washer 85 retains the reset lever 82 in the opening 83. It will be apparent that a downward force exerted on the portion 82b of the reset lever 82 will cause pivotal movement of the rod 80 in a counterclockwise direction as viewed in FIG. 3 of the drawings.

Figure 4:
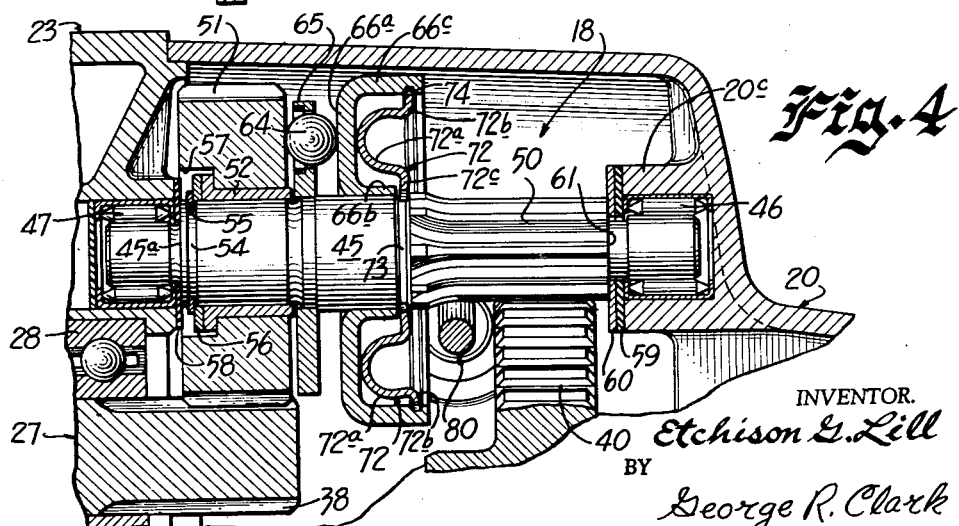
FIG. 4 is a fragmentary view of FIG. 3 with the overload clutch shown in the disengaged or nontorque transmitting condition.

So that such counterclockwise rotation of the rod 80 will perform a clutch resetting operation, the rod 80, as best shown in FIG. 2 of the drawings, has a central yoke or forked portion 80c of such a curvature as to extend around the shaft 45 and engage the clutch cup 66 to move the same from the position shown in FIG. 4 of the drawings to the position shown in FIG. 3. As illustrated in the drawings, the reset lever 82 is located at the handle side of the mower 10 and positioned so that it can be actuated readily by stepping on the portion 82b with the foot. It cannot readily be actuated while the operator is attempting to remove things from the reel and its location is a safety feature preventing resetting of the clutch while the operator is in a position to be injured by the reel should it begin to rotate again.

In view of the detailed description included above, the operation of the overcenter clutch of the present invention will be readily understood by those skilled in the art. It is simple and compact and utilizes the elements of the reduction gear mechanism, which are required in any event. In other words, even without the overload clutch it would still be necessary to have the gear 51 and the shaft 45 with its associated gear 50 driving the gear 40. The extra elements that are necessary, then, are the balls 64, the clutch cup 66, the combined ball retainer and drive plate 65, and the reset rod 80 with its associated parts. All of these elements lend themselves readily to simple manufacturing processes and can be assembled in a very easy manner.

While there has been shown and described a particular embodiment of the present invention, it will be apparent to those skilled in the art that various changes and modifications may be made without departing from the invention in its broader aspects, and it is, therefore, contemplated in the appended claims to cover all such changes and modifications as fall within the true spirit and scope of the present invention.

What is claimed as new and desired to be secured by Letters Patent of the United States is:

1. An overload clutch comprising, a driving shaft, a driven shaft, a combined drive plate and drive member retainer secured to said driven shaft, rotatable means drivingly connected to said driving shaft and rotatable about the axis of said driving shaft, a plurality of conically-shaped shallow recesses defined in one face of said rotatable means, a plurality of spherical drive members retained by said plate and receivable in said recesses, a presser member mounted for longitudinal movement along said driven shaft, and overcenter spring means comprising a plurality of radially spaced leaf springs for urging said presser member either toward a clutch engaging position thereby to hold said spherical members in said recesses whereby said rotatable means drives said driven shaft or toward a clutch disengaging position where said spherical members are free of said recesses.

2. An overload release device comprising, a driving shaft, a driven shaft, a rotatable member drivingly connected to said driving shaft, a shallow conical recess defined in one face of said member, a drive plate secured to said driven shaft adjacent said one face of said member, means defining an opening in said drive plate capable of being aligned in concentric relationship with said recess, a spherical member disposed in said opening and receivable in said recess when said opening and recess are in concentric alignment, a presser member mounted for longitudinal movement along said driven shaft, and a flat spring member having a U-shaped central portion for urging said presser member toward said drive plate to a first position to hold said spherical member in said recess whereby said member drives said driven shaft, said spherical member being cammed out of said recess upon relative movement between said gear and said drive plate to move said presser member away from said drive plate toward a second position, said spring member holding said presser plate in said second position when said presser member is moved away from said drive plate.

3. An overload release device for interrupting the power transmission between a driving and driven shaft upon a predetermined overload applied to said driven shaft, the combination with said driving and driven shafts of a gear drivingly connected to said driving shaft, a plurality of equally spaced recesses defined in one face of said gear on a common circumference, a plurality of balls one receivable in each of said recesses, a ball retainer plate secured to said driven shaft adjacent said one face of said gear, said plate having a plurality of openings equal in number to said recesses and spaced like said recesses to retain said balls in a position for movement into said recesses, a presser member mounted for longitudinal movement on said driven shaft and having an annular surface engageable with said balls on the side of said plate remote from said one face, and spring means comprising a plurality of radially spaced leaf springs for causing said presser member to press said balls into said recesses to drive said driven shaft from said gear until a predetermined overload occurs, said spring means moving said presser member away from said balls upon the occurrence of said predetermined overload whereby said gear is disconnected from said driven shaft.

4. An overload clutch comprising, a shaft, a driving member freely rotatable on said shaft and provided with recesses therein, a driven member secured to said shaft and having openings defined therein, a plurality of spherical members freely movable in said openings and positioned to enter said recesses effectively to lock said members together, said recesses having sloping walls for camming said balls out of said recesses upon relative movement between said driving and driven member, an annular presser member having a peripheral flange concentric with said shaft and slidably mounted for limited movement along said shaft for moving said spherical members into said recesses, said flange having an inner peripheral groove, a peripheral groove in said shaft, and a leaf spring having one end seated in said groove in said shaft and the other end seated in said groove in said flange.

5. An overload release device for interrupting the power transmission between a driving and driven shaft upon a predetermined overload applied to said driven shaft, the combination with said driving and driven shafts of a gear rotatable on said driven shaft and drivingly connected to said driving shaft, a plurality of equally spaced recesses defined in one face of said gear on a common circumference, a plurality of balls one receivable in each of said recesses, a ball retainer plate secured to said driven shaft adjacent said one face of said gear, said plate having a plurality of openings equal in number to said recesses and spaced like said recesses to retain said balls in a position for movement into said recesses, a presser member mounted for longitudinal movement on said driven shaft and having an annular surface engageable with said balls on the side of said plate remote from said one face, and spring means comprising a plurality of radially spaced leaf springs interposed between said presser plate and driven shaft for causing said presser member to press said balls into said recesses to drive said driven shaft from said gear until a predetermined overload occurs, said spring means moving said presser member away from said balls upon the occurrence of said predetermined overload whereby said gear is disconnected from said driven shaft.

6. In an overload clutch, a shaft means, a first clutch member in driving engagement with said shaft means, a second clutch member for drivingly engaging said first clutch member, a presser member slidably mounted on said shaft means for urging said members into driving engagement, a plurality of spring strips each having U-shaped central portions, and means for retaining said strips under compression between said presser member and said shaft means.

7. An overload clutch comprising, a shaft, a driving member freely rotatable on said shaft and provided with recesses therein, a driven member secured to said shaft and having openings defined therein, a plurality of spherical members freely movable in said openings and positioned to enter said recesses effectively to lock said members together, said recesses having sloping walls for camming said balls out of said recesses upon relative movement between said driving and driven member, an annular presser member having a peripheral flange concentric with said shaft and slidably mounted for limited movement along said shaft for moving said spherical members into said recesses, said flange having an inner peripheral groove, a peripheral groove in said shaft, and a plurality of leaf springs arranged around said shaft each having one end seated in said groove in said shaft and the other end seated in said groove in said flange, said grooves being so located that said springs urge said presser member toward said spherical members when said presser member is in one extreme position along said shaft and said springs urge said presser member away from said spherical members when in its other extreme position along said shaft.

8. In an overload clutch, a first clutch member, a second clutch member adapted to be moved into driving engagement with said first clutch member and movable out of driving engagement therewith by overload, a cup-shaped ring having an outer flange, said outer flange having a groove therein, a rotary member in driving engagement with said second clutch member and having a peripheral groove therein, and a plurality of leaf springs seated under compression in said grooves, said springs serving normally to hold said ring against said second clutch member to hold said second clutch member in driving engagement when said first clutch member, said second clutch member when being disengaged from said first clutch member being adapted to move said ring to a position in which said springs urge said ring away from said second clutch member.

9. In an overload clutch, a shaft, a first clutch member held against movement along said shaft, a second clutch member movable along said shaft into driving engagement with said first clutch member and movable out of driving engagement therewith by overload, one of said members being rotatable relative to said shaft and the other of said clutch members being held against rotation relative to said shaft, a cup-shaped ring having an outer flange and mounted slidably on said shaft, said outer flange having a peripheral groove therein provided with tapered walls, said shaft having a peripheral groove having tapered walls, and a plurality of leaf springs seated under compression in said grooves, each of said springs having arcuate ends fitting into said grooves and having arcuate central portions, said springs serving normally to hold said ring against said second clutch member thereby to hold said second clutch member in driving engagement with said first clutch member, said second clutch member when being disengaged from said first clutch member being adapted to move said ring to a position in which said springs urge said ring away from said second clutch member.

10. The overload clutch of claim 2 wherein said opening includes an insert of resilient material for engaging said spherical member.

11. In an overload clutch, a shaft, a gear having camming ball seats in one face thereof, radial-and-thrust bearing means mounting said gear on said shaft, a ball-retaining plate secured to said shaft for transmitting torque thereto, a plurality of balls carried by said plate and movable into said seats for transmitting torque between said gear and said plate, a presser member slidable on said shaft for pressing said balls into said seats and having a flange overhanging said shaft, said flange having an internal peripheral groove provided with outwardly tapered side walls, said shaft having a peripheral groove provided with outwardly tapered side walls, a plurality of leaf springs having straight end portions and arcuate intermediate portions seated under compression in said grooves, said grooves being so located that said springs urge said presser member in a direction seating said balls in said seats when said balls are substantially in said seats and said springs urge said presser member in a direction away from said balls when said balls have been cammed out of said seats, said springs serving to limit movement of said presser member away from said balls, and manually actuatable means for moving said presser member in a direction for pressing said balls into said seats.

References Cited in the file of this patent

UNITED STATES PATENTS

| | | |
|---|---|---|
| 1,229,570 | Backscheider | June 12, 1917 |
| 1,555,098 | Benko | Sept. 29, 1925 |
| 1,883,164 | Vassakos | Oct. 18, 1932 |
| 2,052,152 | Webb | Aug. 25, 1936 |
| 2,497,893 | Linahan | Feb. 21, 1950 |
| 2,696,705 | Greber | Dec. 14, 1954 |
| 2,728,252 | Connell | Dec. 27, 1955 |
| 2,732,746 | Livermont | Jan. 31, 1956 |
| 2,881,888 | Amtsberg | Apr. 14, 1959 |

FOREIGN PATENTS

| | | |
|---|---|---|
| 717,388 | Great Britain | Oct. 27, 1954 |